May 12, 1959  C. F. KRAMER  2,885,709
WINDSHIELD WIPER CONSTRUCTION
Filed Feb. 23, 1955  4 Sheets-Sheet 1
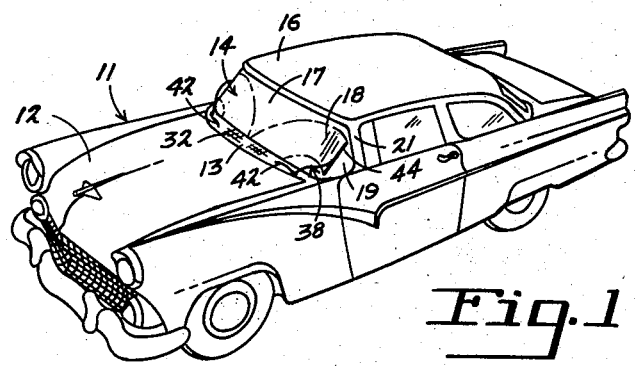
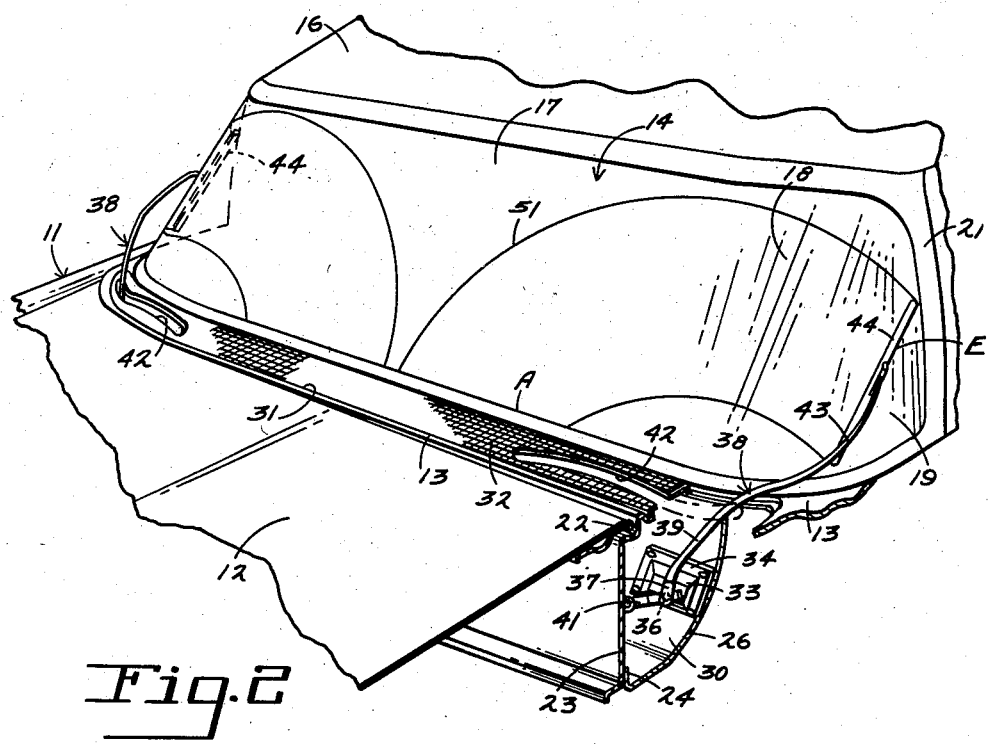
INVENTOR.
C.F. KRAMER.
BY E.C. McRae.
J.R. Faulkner.
T.H. Oster.
ATTYS.

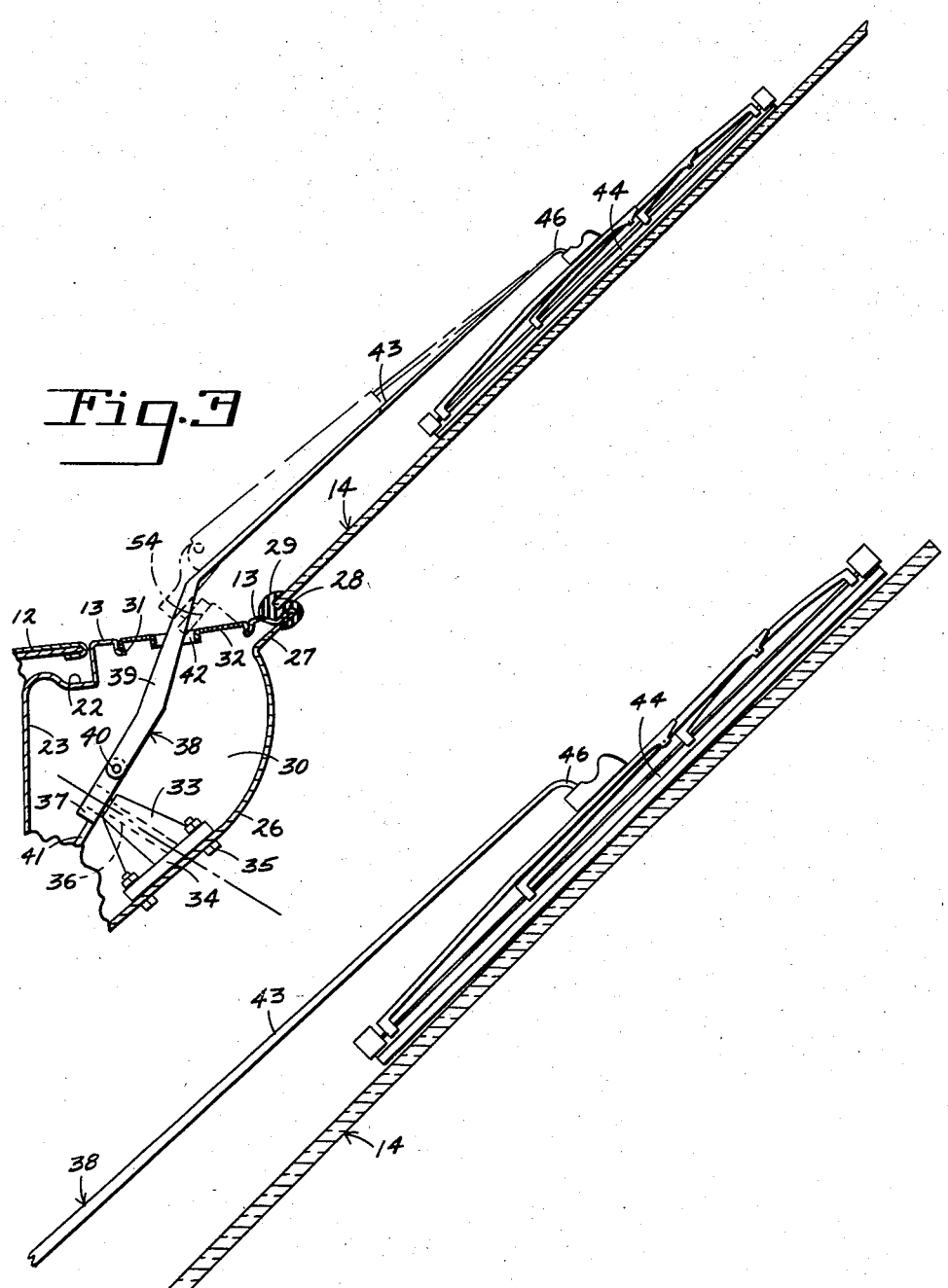

May 12, 1959 — C. F. KRAMER — 2,885,709
WINDSHIELD WIPER CONSTRUCTION
Filed Feb. 23, 1955 — 4 Sheets-Sheet 3
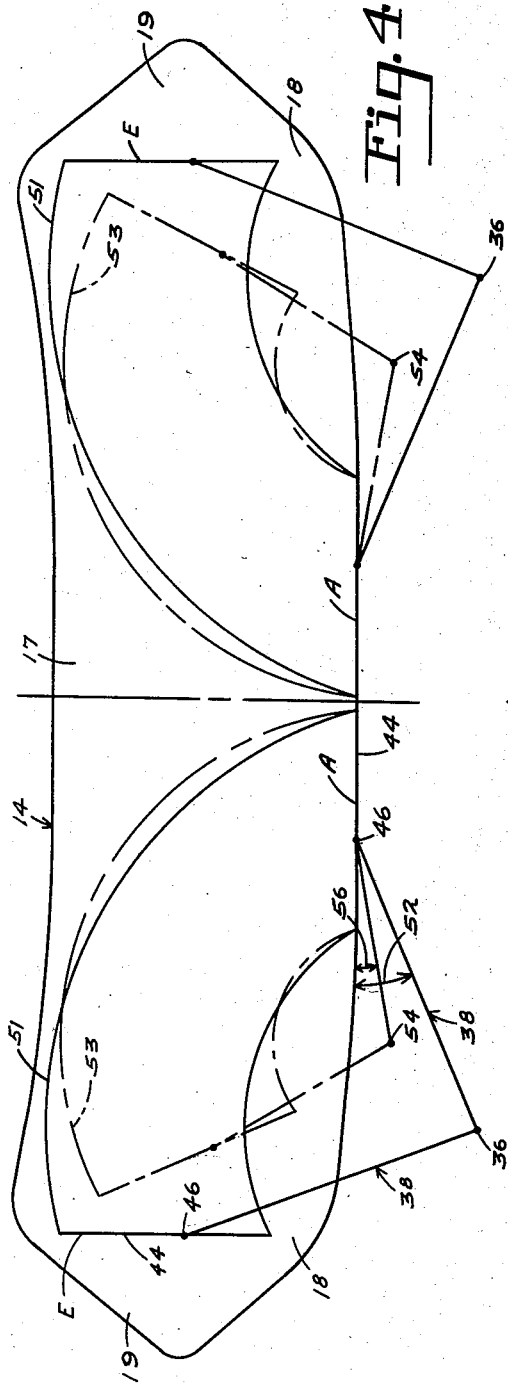
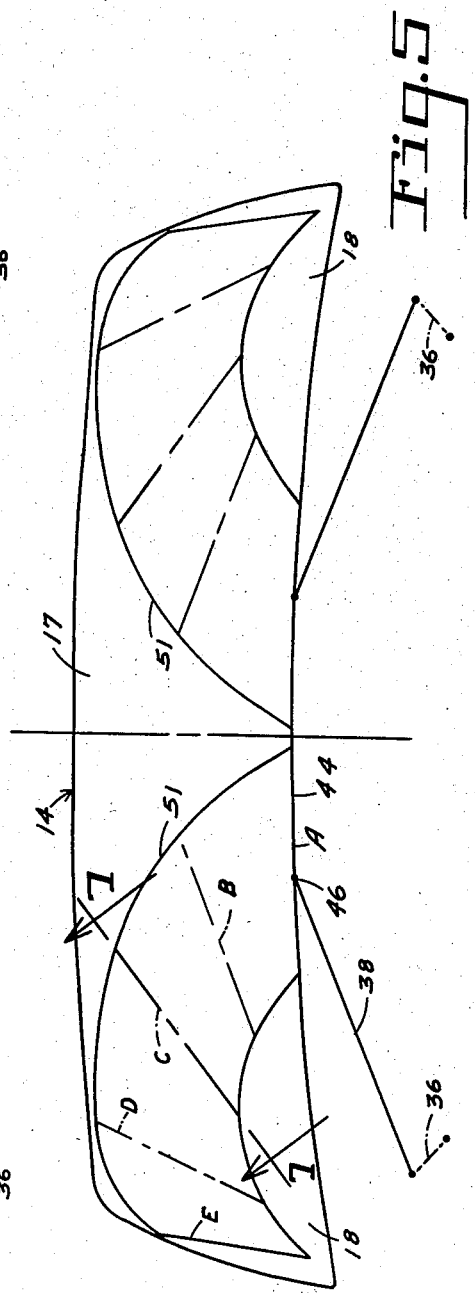
INVENTOR.
C. F. KRAMER.
BY E. C. McRae.
J. R. Faulkner.
T. H. Oster.
ATTYS.

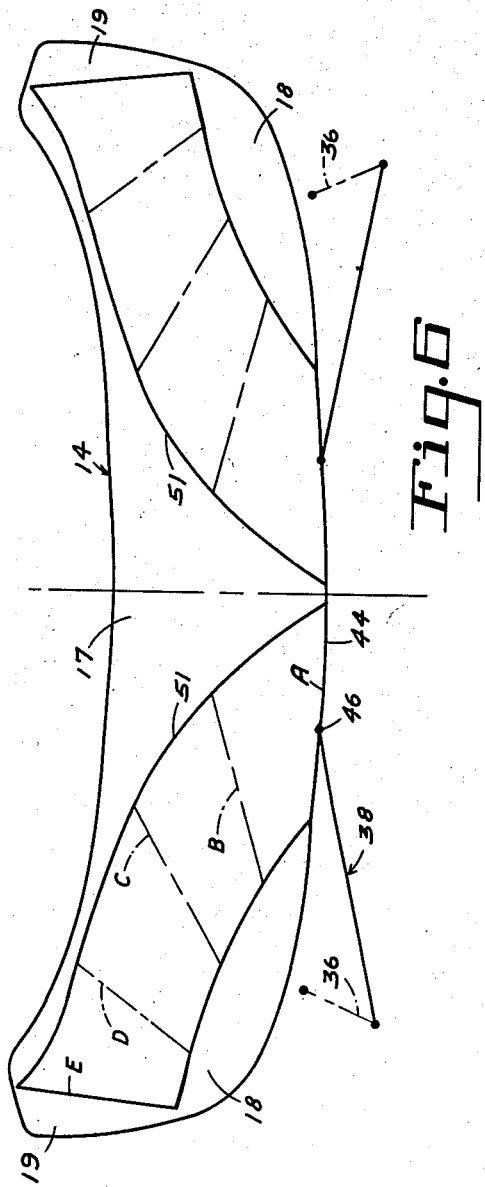

United States Patent Office 2,885,709
Patented May 12, 1959

2,885,709

WINDSHIELD WIPER CONSTRUCTION

Clarence F. Kramer, Birmingham, Mich., assignor to Ford Motor Company, Dearborn, Mich., a corporation of Delaware Application February 23, 1955, Serial No. 489,824

2 Claims. (Cl. 15—255)

This invention relates generally to a motor vehicle body construction, and particularly to a motor vehicle body construction incorporating improved windshield wiper mechanism.

Nearly all present day motor vehicles have curved windshields known as wrap-around windshields. Although increasing visibility and improving appearance, these windshields are difficult to properly wipe with conventional windshield wiper mechanisms. Windshields of this type are usually formed of straight or nearly straight vertical elements, but are curved in a lateral direction with the curvature sharply increasing adjacent the outboard portions of the windshield as the windshield sweeps rearwardly to meet the pillar. Conventional windshield wiper mechanisms utilize a pivot shaft journaled in a housing mounted upon the top of the cowl adjacent the lower edge of the windshield. A wiper arm is mounted upon the oscillating pivot shaft and carries a windshield wiper blade traversing an area of the windshield. With wrap-around windshields, however, difficulty has been encountered in properly wiping an adequate area of the windshield since an attempt to extend the wipe pattern sufficiently far to include the curved side portions of the windshield results in a pattern requiring considerable bending of the wiper blade. Various devices including cams, links, and other complicated mechanisms have been suggested to change the angle of the blade relative to the wiper arm as the blade reaches the side portions of the windshield, but these devices have not been wholly satisfactory.

It is therefore an object of the present invention to provide a motor vehicle body construction incorporating windshield wiper mechanism capable of wiping a larger area of the surface of a curved windshield of the wrap-around type, and to wipe this increased area without requiring undue bending of the wiper blade. It is a further object of the invention to accomplish these aims with a construction which is simple in structure, and economical to manufacture and assemble.

Other objects and advantages of this invention will be made more apparent as this description proceeds, particularly when considered in connection with the accompanying drawings, wherein:

Figure 1 is a perspective view of a motor vehicle body construction incorporating the present invention.

Figure 2 is an enlarged fragmentary perspective view, partly broken away and in section, of the construction shown in Figure 1.

Figure 3 is an enlarged cross sectional view, taken on a vertical longitudinally extending plane through the windshield.

Figure 4 is a developed view of the vehicle windshield and the windshield wiper mechanism therefor, with each half of the windshield being viewed in a direction parallel to the pivotal axis of the pivot shaft of the windshield wiper arm.

Figure 5 is a schematic front elevational view of a vehicle windshield, the wiper mechanism therefor, and the wipe pattern.

Figure 6 is a schematic plan view of the construction shown in Figure 5.

Figure 7 is an enlarged cross sectional view taken on the plane indicated by the line 7—7 of Figure 5.

Referring now to the drawings, and particularly to Figures 1, 2, and 3, the reference character 11 indicates generally a motor vehicle body having a hood 12, the upper portion of which extends substantially horizontally, and a cowl 13 also extending substantially horizontally in alignment with the upper portion of the hood 12. A curved windshield 14 is mounted between the cowl 13 and the roof panel 16. The windshield 14 is of the wrap-around type having a central portion 17 curved slightly transversely of the vehicle. Adjacent each side of the windshield, the moderately curved central portion 17 of the windshield merges into a more sharply curved intermediate or corner portion 18, and continues into a side portion 19 extending rearwardly to a substantially vertical windshield pillar 21. Although this type of windshield is usually formed of straight or substantially straight vertical elements, even at the corners and side portions, it is rather sharply curved adjacent each side in a lateral direction, and is consequently difficult to efficiently wipe by conventional means.

As best seen in Figures 2 and 3, the cowl 13 of the vehicle body is formed at its forward edge with a drain trough 22 extending transversely of the vehicle and receiving a weather strip (not shown) to support and seal the rearward edge of the hood 12. Forwardly of the drain trough 22, the cowl 13 is formed with a vertical wall 23, the lower portion of which is joined to an upwardly extending flange 24 formed at the lower forward portion of an inner panel 26. The inner panel 26 has an inclined upper marginal flange 27 joined to an adjacent flange 28 of the cowl 13. A windshield weather strip 29 surrounds the windshield 14 and embraces the juxtaposed flanges 27 and 28 to support the windshield glass upon the vehicle cowl.

In the construction shown, the cowl 13 and the inner panel 26 cooperate with each other to form a transversey extending air chamber 30 for the vehicle ventilating heating system. Outside air may enter the chamber 30 through an elongated air intake opening 31 provided in the upper wall of the cowl 13, the air intake opening 31 being covered by a suitable grille or screen 32. Suitable openings and connections (not shown) may be made with the air chamber for the purpose of directing air to the interior of the passenger compartment for ventilating, heating or defrosting purposes.

A pair of journal supports 33 are provided within the air chamber 30, one adjacent each side of the vehicle. Each of the journal supports 33 is formed with a base flange 34 secured to the inner panel 26 by means of bolts 35. A pivot shaft 36 is journaled in each journal support 33 and supports the head 37 of a windshield wiper arm assembly 38. The arm 39 of the windshield wiper arm assembly 38 is pivotally connected to the head 37 thereof by means of a transversely extending pivot pin 40. Conventional spring means (not shown) within the arm assembly 38 constantly urge the arm 39 thereof in a clockwise direction relative to the head 37 so as to maintain the wiper blade carried by the arm in engagement with the windshield. The windshield arm assemblies 38 at opposite sides of the vehicle are suitably interconnected by linkage 41 and are conventionally driven by a windshield wiper motor (not shown) concealed beneath the cowl.

An elongated slot 42 is formed in the grille 32 at each side of the vehicle. The windshield wiper arm 39 projects through the slot 42 and has an exterior upper portion 43 extending generally parallel to the windshield 14 and supporting a windshield wiper blade 44 upon its terminal end portion 46. The windshield wiper blade 44 is of the conventional multiple yoke type and is capable of limited flexing or bending to maintain wiping contact throughout its length with a curved windshield.

Reference is now made to Figure 4 as well as to Figure 2. Figure 4 shows a developed view of the windshield 14, with each half of the windshield being viewed along a line of sight parallel to the axis of the adjacent pivot shaft 36. Since each pivot shaft 36 is inclined downwardly in a rearward direction with respect to a horizontal plane, and is also inclined inwardly toward the longitudinal center line of the vehicle, each half of Figure 4 is viewed in a downwardly and inwardly inclined manner.

The outline of the windshield 14 shown in Figure 4 represents the juncture between the windshield glass and its weather strip, so that only the visible portion of the glass is shown. The wipe pattern traversed by the windshield wiper blade 44 during its cycle is shown in full lines at 51, and it will be seen that the blade 44 swings from a parked position A immediately adjacent the lower edge of the windshield to an extreme side position E. The angle 52 between the windshield wiper arm 38 and the windshield wiper blade 44, known as the park angle, is constant throughout the cycle. This angle is relatively large due to the location of the pivot shaft 36 at a point considerably beneath the cowl 13 of the vehicle body, and this relatively large park angle 52 contributes to the efficient wiping of a larger area of the wrap-around windshield 14.

For purposes of comparison, there is shown in dot-dash lines a wipe pattern 53 for a conventional wiper mechanism having a pivot shaft 54 located conventionally above the vehicle cowl. Although the standard pivot shaft 54 appears in Figure 4 to be located beneath the lower edge of the windshield, this is because of the angle at which the windshield is viewed, and in fact the pivot shaft 54 is located in a housing mounted on top of the vehicle cowl, as better shown in dot-dash lines in Figure 3. It will be seen that with the conventional pivot shaft 54 the angle between the wiper arm and blade, or park angle 56, is relatively small and is substantially smaller than the park angle 52 of the mechanism of the present invention.

The wipe pattern 53 of the conventional wiper mechanism is necessarily much smaller than that obtainable with the present invention, since any attempt to extend the blade movement beyond the outer position shown would result in the windshield wiper blade traversing laterally across the sharply curved corner portions 18 of the windshield, and proper wiping would be difficult due to the fact that the blade would be required to bend considerably to conform to the surface of the glass in this area.

The extreme outer position E of the wiper blade of the present construction, on the other hand, is much nearer the pillar 21, and the blade is also more nearly vertical. This is made possible by the increased park angle of the arm and blade and the location of the pivot shaft 36 at a greater distance from the vehicle center line.

Reference is now made to Figure 5 which shows a true front elevational view of the construction. It will be seen that the pivot shaft 36 is located a substantial distance beneath the lower edge of the windshield 14 and is also located much nearer the outboard side portions of the windshield than is possible with conventional constructions. As seen in front elevation, the pivot shaft 36 is inclined downwardly in a rearward direction and is also inclined inwardly toward the longitudinal center line of the vehicle to enable the windshield wiper arm 38 and blade 44 to be properly positioned with respect to the curved windshield.

As viewed in the front elevation of Figure 5, it will be noted that the wipe pattern 51 effectively covers a large portion of the windshield area, the windshield wiper blade 44 swinging from its parked position A adjacent the lower edge of the windshield glass through typical intermediate positions B, C, and D to its extreme side position E. The pattern thus provided is not only larger but is traversed by the windshield wiper blade 44 in such manner that at all times the windshield wiper blade contacts a nearly flat element of the windshield glass.

Figure 7 illustrates a cross section of the windshield at position C, and it will be seen that along this line the windshield glass is very nearly flat. To illustrate this, the windshield wiper blade 44 has been drawn in Figure 7 with its wiping edge perfectly straight, and it will be seen that only a relatively small amount of bending of the windshield wiper blade is necessary to conform the blade to the windshield in this area. Position C is typical, and the sections at positions D and E are substantially the same, even though in this area the blade is wiping the sharply curved side portion of the windshield. Thus it will be seen that a more efficient wiping job can be accomplished with the geometry of the present construction, since it permits the wiper blade to closely follow the straight line elements of the windshield so that only a very small bending of the windshield wiper blade is necessary to conform the blade edge to the windshield surface.

Figure 6 is a true plan view of the windshield 14 and the wipe pattern 51 of the present construction. The angle of the pivot shafts 36 with respect to the longitudinal center line of the vehicle is clearly shown in Figure 6, and it will be noted that this angle is considerably larger than conventional practice and is thus better adapted to properly position the blade with respect to the sharply curved side portions of the wrap-around windshield.

Referring again to Figures 1 and 2, it will be noted that the slots 42 in the cowl are shaped so as to provide clearance for the lower intermediate portion of the windshield wiper arm 39 during its cycling movement. The central portion of each slot 42 extends generally transversely, while the inboard ends of the slots are curved forwardly and the outboard ends are curved rearwardly to follow the fore and aft movement of the windshield wiper arm as the blade traverses the wrap-around windshield. It will also be noted that the windshield wiper arm 39, as viewed in front elevation, is generally of a broad S or goose neck shape to minimize the length of the slot 42 and to align the upper exposed portion 43 of the arm generally with the windshield wiper blade 44.

Although the present construction is shown in connection with a vehicle utilizing a cowl top air intake for the ventilating system, and with the pivot shaft supports mounted within a transversely extending air chamber directly beneath the cowl, it may be applied to a vehicle which does not utilize a cowl top air intake, and the pivot shaft supports may be suitably mounted in any desired manner beneath the vehicle cowl with the proper openings being provided to the upper portion thereof for the passage of the windshield wiper arms.

It will be understood that the invention is not to be limited to the exact construction shown and described, but that various changes and modifications may be made without departing from the spirit and scope of the invention, as defined in the appended claims.

What is claimed is:

1. In a motor vehicle having a wraparound windshield comprising a central portion curved slightly transversely of the vehicle and merging into a sharply curved corner portion, said corner portion terminating in a side portion extending rearwardly to a windshield pillar, a cowl extending forwardly from adjacent the lower edge of said windshield, a support beneath said cowl, an elongated windshield wiper arm, pivot means mounting said wiper arm on said support for swinging movement about an axis inclined downwardly in a rearward direction and inwardly in a lateral direction toward the longitudinal centerline of the vehicle, said axis being located substantially beneath the juncture of said central portion and said corner portion, said windshield wiper arm having a broad S-shaped arm terminating in a free end portion having its longitudinal axis offset from the longitudinal axis of its pivot end portion, said offset being positioned laterally outwardly of the vehicle when said arm is at the limit of its swinging movement away from the longitudinal center line of the vehicle, and a wiper blade carried at said free end of the wiper arm, the shape of said wiper arm and the location and inclination of said pivot axis providing a construction and arrangement whereby the blade maintains contact with substantially flat elements of the windshield as it traverses a wipe pattern extending from a point beyond said corner to a point on said central portion near the center of said vehicle.

2. In a motor vehicle having a wraparound windshield comprising a central portion curved slightly transversely of the vehicle and merging into a sharply curved corner portion, said corner portion terminating in a side portion extending rearwardly to a windshield pillar, a cowl extending forwardly from adjacent the lower edge of said windshield, a support beneath said cowl, an elongated windshield wiper arm, pivot means mounting said wiper arm on said support for swinging movement about an axis inclined downwardly in a rearward direction and inwardly in a lateral direction toward the longitudinal centerline of the vehicle, said axis being located substantially beneath the juncture of said central portion and said corner portion, said windshield wiper arm having a broad S-shaped arm terminating in a free end portion having its longitudinal axis offset from the longitudinal axis of its pivot end portion, said offset being positioned laterally outwardly of the vehicle when said arm is at the limit of its swinging movement away from the longitudinal center line of the vehicle, and a wiper blade carried at said free end of the wiper arm, the shape of said wiper arm and the location and inclination of said pivot axis providing a construction and arrangement whereby the blade maintains contact with substantially straight line elements of the windshield as it traverses a wipe pattern extending from a point beyond said corner to a point on said central portion near the center of said vehicle, said blade traversing said corner portion in a substantially vertical position.

References Cited in the file of this patent

UNITED STATES PATENTS

| | | |
|---|---|---|
| 1,719,444 | Oishei | July 2, 1929 |
| 2,286,449 | Wahlberg | June 16, 1942 |
| 2,691,186 | Oishei | Oct. 12, 1954 |
| 2,739,681 | Bowers et al. | Mar. 27, 1956 |
| 2,759,214 | Madunich | Aug. 21, 1956 |

FOREIGN PATENTS

| | | |
|---|---|---|
| 1,089,413 | France | Sept. 29, 1954 |